United States Patent
Deshmukh et al.

(10) Patent No.: US 9,706,005 B2
(45) Date of Patent: Jul. 11, 2017

(54) PROVIDING AUTOMATABLE UNITS FOR INFRASTRUCTURE SUPPORT

(71) Applicant: Tata Consultancy Services Limited, Mumbai (IN)

(72) Inventors: Veena Sadashiv Deshmukh, Pune (IN); Rahul Ramesh Kelkar, Pune (IN); Sudha Vvl Kancharla, Pune (IN); Mudit Dhagat, Pune (IN); Sandeep Chougule, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 307 days.

(21) Appl. No.: 14/515,585

(22) Filed: Oct. 16, 2014

(65) Prior Publication Data

US 2015/0113008 A1    Apr. 23, 2015

(30) Foreign Application Priority Data

Oct. 17, 2013   (IN) .......................... 3264/MUM/2013

(51) Int. Cl.
*G06F 17/30*   (2006.01)
*H04L 29/08*   (2006.01)
*H04L 12/24*   (2006.01)

(52) U.S. Cl.
CPC ........ *H04L 67/2819* (2013.01); *H04L 41/069* (2013.01); *H04L 41/5074* (2013.01); *H04L 41/0686* (2013.01)

(58) Field of Classification Search
CPC ............... G06F 17/30; G06F 17/30699; H04L 67/2819; H04L 41/5074

USPC .................................................. 707/600–899
See application file for complete search history.

(56) References Cited

U.S. PATENT DOCUMENTS

| | | |
|---|---|---|
| 6,038,538 A | 3/2000 | Agrawal et al. |
| 2007/0100782 A1 | 5/2007 | Reed et al. |
| 2008/0155564 A1* | 6/2008 | Shcherbina ............ G06Q 10/06 719/318 |

OTHER PUBLICATIONS

"Extension of LogAn with pattern recognition", www.fmtc.be, Flanders' Mechatronics Technology Centre, (Jan. 1, 2012), 1 pg.
Aouladomar, Farida, "Some Foundational Linguistic Elements for QA Systems: an Application to E-government services", Proceedings of the 2005 Conference on Legal Knowledge and Information Systems: JURIX: 2005, (2005), 81-90.

(Continued)

*Primary Examiner* — Isaac M Woo
(74) *Attorney, Agent, or Firm* — Schwegman Lundberg & Woessner, P.A.

(57) ABSTRACT

The present subject matter relates to providing automated units for infrastructure support. In an example, an operation log having information pertaining to actions performed to resolve a ticket, may be filtered based on filtering attributes. The filtering attributes may aid in selection of content relevant for identifying an automatable unit from the operation log. The automatable unit may be one of a standard operator unit and a control flow unit. The content may be further analyzed to generate the automatable unit. The content may be analyzed using one of a sequence mining technique and a graph mining technique. Further, the automatable unit may be provided in a support service knowledgebase accessible by the users for dynamically resolving tickets similar to the ticket.

17 Claims, 4 Drawing Sheets

(56) References Cited

OTHER PUBLICATIONS

Inokuchi, Akihiro, et al., "An Apriori-Based Algorithm for Mining Frequent Substructures from Graph Data", Principles of Data Mining and Knowledge Discovery, Lecture Notes in Computer Science, vol. 1910, (2000), 13-23.

Paris, Cecile, et al., "Automated knowledge acquisition for instructional text generation", SIGDOC '02 Proceedings of the 20th annual international conference on Computer documentation, (2002), 142-151.

Robles-Kelly, Antonio, et al., "Graph edit distance from spectral seriation", IEEE Trans Pattern Anal Mach Intell. (Mar. 2005); 27(3):365-78, (Mar. 2005), 365-78.

Srikant, Ramakrishnan, et al., "Mining Sequential Patterns: Generalizations and Performance Improvements", EDBT '96 Proceedings of the 5th International Conference on Extending Database Technology: Advances in Database Technology, (1996), 3-17.

Turan, Paul, "A Note of Welcome", Journal of Graph Theory, vol. I, 7-9 (1977), 7-9.

Vaarandi, Risto, "Event correlation and data mining for event logs", Powerpoint Presentation, (Dec. 2, 2006), 39 pgs.

Vaarandi, Risto, "Tools and Techniques for Event Log Analysis", Doctoral Thesis, Tallinn University of Technology, (Jun. 17, 2005), 47 pgs.

Yang, Jiong, et al., "Mining long sequential patterns in a noisy environment", SIGMOD '02 Proceedings of the 2002 ACM SIGMOD international conference on Management of data, (2002), 406-417.

Zhang, Ziqi, et al., "Automatically Extracting Procedural Knowledge from Instructional Texts using Natural Language Processing", LREC 2012: 520-527, (2012), 520-527.

\* cited by examiner

PROVIDING AUTOMATABLE UNITS FOR INFRASTRUCTURE SUPPORT

TECHNICAL FIELD

The present subject matter relates, in general, to information technology environment and in particular, to providing automatable units for infrastructure support in the information technology environment.

BACKGROUND

Information technology (IT) has grown in use by businesses from many years and today, IT infrastructure serves as a backbone for entire business structure. IT infrastructure refers to basic IT support system that is shared among all users involved in a business process. IT infrastructure not only refers to hardware, but also includes a combined set of elements, such as software, hardware, networks, facilities, and information, in order to develop, test, deliver, monitor, control, and support IT services. Many business processes rely on the IT infrastructure to an extent that the business processes may cease to operate without properly functioning IT systems. Hence, the organizations usually set up one or more production support teams that continuously resolve incidents or service requests by performing support actions, also referred to as support services.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods, in accordance with embodiments of the present subject matter, are now described by way of example only, and with reference to the accompanying figures, in which.

DETAILED DESCRIPTION

System(s) and method(s) for providing automatable units for infrastructure support in an information technology (IT) environment are described herein. The systems and methods described herein can be implemented on computing devices, including, but not limited to, servers, desktop computers, hand-held devices, mobile devices, notebooks, and laptops.

IT infrastructure of an organization typically includes infrastructure elements, such as software, hardware, and other components, which may be used to deliver IT services to its customers. Generally, an efficient delivery of the IT services requires proper support from a set of infrastructure tools, which performs operations on the infrastructure elements. Often times, delivery of IT services may be interrupted due to various reasons, for example, due to malfunctioning of one of the infrastructure elements.

Typically, for each such issue or interruption, a ticketing system may allot a ticket identification number or a code, to each interruption or to say to each IT service related issue. The allotted tickets may be allocated to a production support team for resolving the issue associated with the tickets. Typically, various operations being performed on the infrastructure elements, in process of resolving the issue, may be appended to a log that is maintained at individual infrastructure elements.

Further, often same issue may be resolved multiple times using similar operations, at each individual infrastructure element. However, at each instance of the same issue, a user from the production support team may have to analyze the issue and provide the operation for resolving without benefiting from previous actions that are performed to resolve the issue. This in turn may affect the efficiency of a support team. With the ever growing IT environment, redundancy in actions performed to resolve similar issues may provide for inefficient utilization of computational as well as human resources.

To resolve similar issues, existing knowledge, for example, in form of logs, may be used. Further, available knowledge-bases, such as a service catalog or a web based knowledge sharing application, which provide guidance for resolving an issue are typically static in nature and may not be updated in real time with probable solutions to resolve an issue. Furthermore, traditional methods of production support may result in a log pertaining to each individual infrastructure element and such logs may have very limited context information, most of the times limited to support team member and session. Accordingly, such logs provide very little value as a knowledge source.

Moreover, even with the availability of logs, which may serve as rich knowledge source, such logs are often not analyzed and used as a knowledge source, which may result in certain irrelevant actions or non-efficient operations to be performed repeatedly and high dependency on human expertise, thereby resulting in inefficient utilization of the computational time and resources.

According to an embodiment of the present subject matter, systems and methods for automation of infrastructure support services are described herein. The present subject matter provides for using a dynamic knowledgebase having context related information and providing partial or complete automation for resolving of issues, based on the dynamic knowledgebase. In an example, the partial or complete automation may be provided by determining automatable units, such as standard operators and control flows, and subsequently automating the determined units. For the purpose of explanation, complete automation may be understood to involve no human intervention and the users may directly fetch and execute the automatable unit, such as standard operators and control flow, while the partial automation may be understood to involve some level of human intervention or, to say, manual analysis.

A standard operator unit, hereinafter referred to as standard operator, may be understood as a set of instructions that are to be performed to resolve a ticket and may form part/full of a support service. A control flow unit, hereinafter referred to as control flow, may include a set of possible actions to be performed for each of a plurality of states of an infrastructure element to with the resolve the ticket associated infrastructure element. Thus, multiple instances of same issue resolved at different times by different resolvers may be considered to generate the control flow, which may capture all possible conditions and resolution path for that issue. The control flow can be converted to, for instance, to an executable script, which then can be used to automate the resolution of that particular type of issue. In an example, the control flow may provide an execution flow, which may include automated script corresponding to some of the commands, while, in another example, the control flow may include automated script corresponding to all the commands.

In an implementation, every action performed by a user to resolve ticket and the details associated with the action may be captured in a log, referred to as, operational log. The operation log may include a large set of sequences, where each sequence is an ordered set of command(s) corresponding to each action performed by the user. For each action, details, such as user role, time stamp, commands executed, output of commands, ticket ID, and ticket attributes are recorded. The ticket attributes may be defined as one or more characteristics of the ticket which provide details pertaining to the issue associated with the ticket. Example of the ticket attributes include, but are not limited to, ticket category, ticket type, and ticket summary. For the details pertaining to the user may include, for example, user ID, support team, and role. Thus, every operation performed by the user may be captured and appended to an operation log, which is dynamically updated and functions as the dynamic knowledgebase Since, the operation log stores information pertaining to not only the actions performed by the users but also the information regarding the ticket itself, it will be appreciated that operational logs may be voluminous. In addition to being voluminous, the operational logs may contain noise, thereby making analysis of such operational logs a cumbersome task, which may involve considerable time and resources.

In an implementation, an operational log may be filtered, cleaned and analyzed to determine the automatable units. As mentioned earlier, the automatable unit may be of two types, viz., standard operators or control flows to resolve tickets. In an example, the operational log may be filtered to obtain filtered content, based on one or more filtering attributes. The filtering attributes may include ticket attributes or other attributes, such as user role, which are recorded in the operational log for each command sequence. The filtering attributes define the content to be selected for identification of automatable units. The filtering attributes may be selected based on the type of an automatable unit to be indentified. Accordingly, the filtering attributes may aid in selection of content, relevant for generating an automatable unit, from the operation log. The filtering attributes include for example, date range, role of a user, ticket classification, type of server's platforms, such as Unix® and Linux®. For instance, if ticket classification and user role, such as L3 is selected, all the sequence pertaining to the selected ticket classification performed by all the user is in the L3 category may be obtained. Thus, the content obtained upon filtering may include sequences, which correspond to the selected filtering attributes. Therefore, the filtered content may be substantially less voluminous and more relevant as compared to the original operational log.

Further, from the filtered content noise, i.e., irrelevant or meaningless data may be removed to ensure subsequent analysis is performed efficiently. The filtered content may be cleaned based on cleaning configuration data to remove the noise, such as unnecessary commands or tautological actions performed by a user. Further, the cleaning configuration data includes a list of such commands and operations and rules defining which of the commands indicated in the cleaning configuration data are to be removed from the filtered content, based on the type of the automatable unit. For instance, certain commands may be taken as noise while determining standard operators while the same commands may have to be considered while providing the control flows. Thus, the cleaning of the filtered content addresses removal of redundant commands, removal of no command entries, removal of purely investigative commands, generalization of commands with respect to the parameters, etc.

The cleaned content may be further analyzed using an automation analysis technique, based on the type of the automatable unit. The analysis of the cleaned content may provide for determination of the automatable units. In an example, the automation analysis technique may be an apriori based analysis technique. Further, the automation analysis may be a sequence mining technique in case a standard operator is to be determined, while the automaton analysis may be graph mining technique in case a control flow is to be determined. It will be understood that the automatable units upon being automated may be referred to as automated units.

In an example, where standard operators are to be identified and automated, the analysis technique determines blocks of consecutive and ordered commands as repeating patterns from the cleaned content. While determining the repeating patterns, the order of commands and the repeated occurrences of the commands are also considered, as against traditional apriori based techniques, which is agnostic to the order of elements, which in the present case are commands. Accordingly, patterns having even multiple occurrences of a command within it can be identified. Consequently, command sets having same commands occurring in a different order may be identified as different patterns during analysis, as against traditional apriori techniques, where no distinction may be based on order of commands. Further, based on frequency threshold and tolerance threshold specified by a user, such as administrator, one or more repeating patterns may be identified as potential candidates for automation. The tolerance threshold defines an extent of inexactness permissible between two patterns to consider the two patterns as matching. Based on the user inputs, one or more repeating patterns may be automated to provide a standard operator, for instance the standard operator may be provided as a shell script.

In another example, where control flows are to be provided, graph mining techniques may be applied. In said example, the initial log sequences may be simplistic directed acyclic graphs, such as simple path graphs, where the path includes a single root and single leaf nodes and every other node has a single parent node and a single child node. So a path will have edge count equal to node count minus one. Using the graph mining technique, the largest common sub graph may be obtained and the union of input sequences/graphs may be generated at each iteration step. The final control flow may be provided as a map, a table, a flow chart, etc. In an example, the control flow can be converted to an executable script that also takes into account the intermediate system state decision points.

Thus, it can be observed that the support service knowledgebase is dynamically updated to provide users, of production support teams, automated standard operators, which may be used by the users to resolve the tickets without them having to search and type-in commands regarding the action to be performed. This in turn may reduce the chances of human errors and at the same time may enhance the quality and efficiency of support provided to the infrastructure elements. Likewise, the control flows, which may provide execution flow of operations or tasks for resolving tickets may be used by the users to take an informed decision while executing an operation to resolve a ticket, based on a given state of a corresponding infrastructure element. Accordingly, provision of the support service knowledgebase, which is dynamically updated and provided as automated services, may increase the efficiency of infrastructure support and may also help reduce computational time and resources required to resolve tickets. Further, the use of automated units may also provide for reduction in manual error, which may also provide for better utilization of the resources.

While aspects of described system(s) and method(s) of providing automated units for infrastructure support can be implemented in any number of different computing systems, environments, and/or configurations, the implementations are described in the context of the following example system(s) and method(s).

Figure 1:
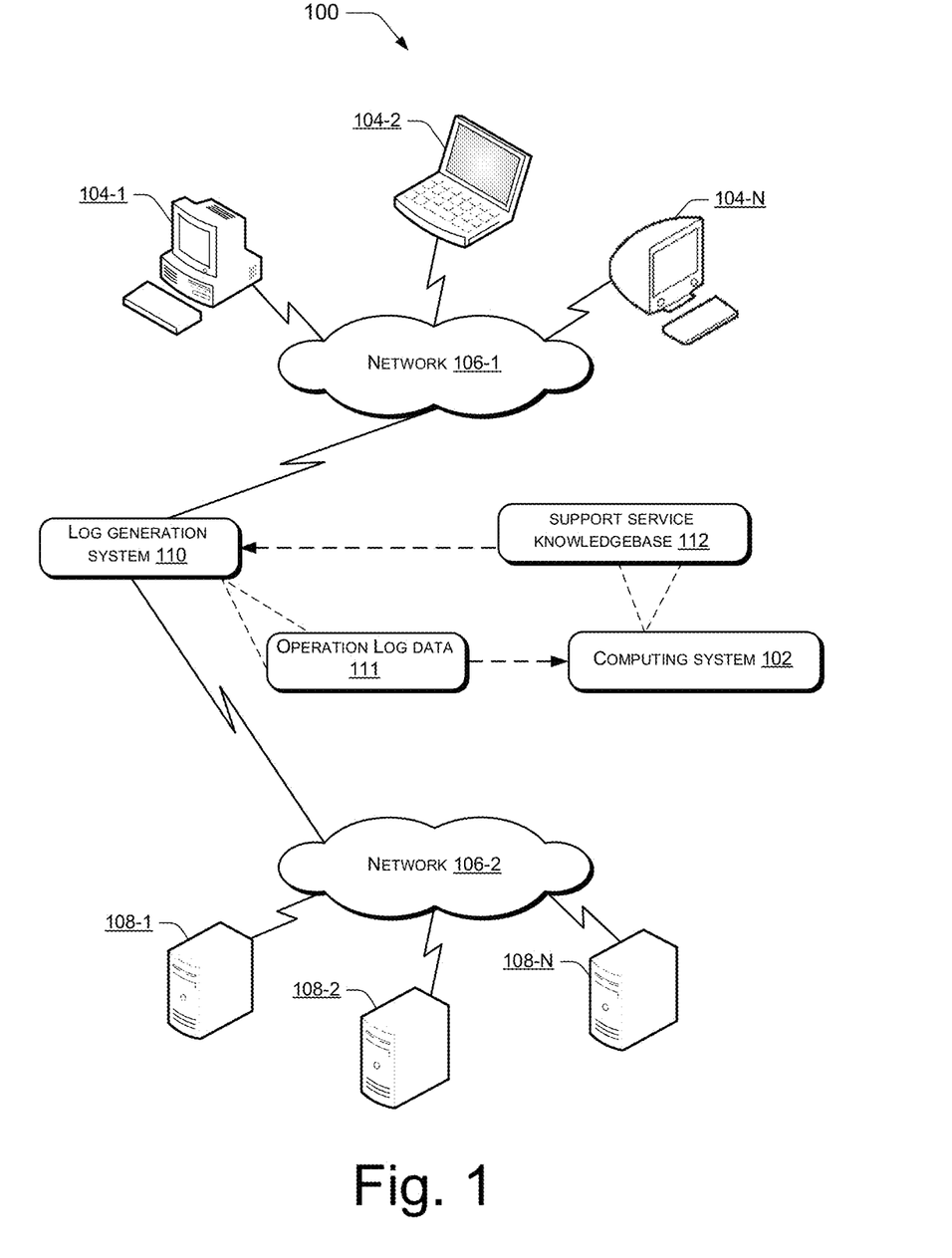
FIG. 1 illustrates a network environment including a computing system, in accordance with an implementation of the present subject matter.

FIG. 1 illustrates a network environment 100 implementing a computing system 102, hereinafter referred to as system 102, for providing automated units to provide infrastructure support, in accordance with an embodiment of the present subject matter. In one implementation, the network environment 100 can be a public network environment, including various servers and computing devices. In another implementation, the network environment 100 can be a private network environment with a limited number of computing devices, such as personal computers, servers, laptops, and/or communication devices, such as mobile phones and smart phones.

In one implementation, the network environment 100 also includes a log generation system 110. The log generation system 110 may be communicatively connected to user devices 104-1, 104-2, . . . , 104-N, corresponding to users in one or more production support teams, through a network 106-1. The user devices 104-1, 104-2, . . . , 104-N may be hereinafter individually and commonly referred to as user device(s) 104. The user device(s) 104 may include multiple applications that may be running to perform several functions, as required by different users and individual organizations. The user device 104 may be implemented as, but are not limited to, desktop computers, hand-held devices, laptops or other portable computers, tablet computers, and the like. Similarly, the log generation system 110 may be communicatively connected to one or more infrastructure elements 108-1, 108-2, . . . , 108-N, hereinafter referred to as infrastructure element(s) 108, through the network 106-2. In said implementation, the user device 104 may be communicatively connected to the one or more infrastructure elements 108 via the log generation system 110. Further, the infrastructure element 108 may include one or more server platforms, such as Windows®, Unix®, and Linux®. When the user device 104 is connected to the infrastructure elements 108 through the log generation system 110, the log generation system 110 functions as a proxy console for communication between the user device 104 and the infrastructure element 108.

The network 106-1 and 106-2 may be a wireless or a wired network, or a combination thereof. Further, the network 106-1 and 106-2 may be hereinafter referred to as network 106. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate with each other.

In an implementation, one or more issues associated with the infrastructure elements 108 may be determined and tickets may be created in a ticketing system (not shown in the figures) for the determined issues. The generated tickets may be allotted to the users, for resolving the issues associated with the tickets. In an example, users may be notified regarding the issues associated with the infrastructure elements 108, and the users may be allowed to create a ticket, from a ticketing system, for each issue. In one implementation, the generated tickets may be allotted to each user of the production support team, and the user may be notified regarding the allotted tickets.

Each ticket generated in the ticketing system may be associated with ticket attribute data which includes, but not limited to, ticket id, ticket category, ticket type, and ticket summary. Further, in order to resolve the issue, each user of the production support team may be verified with unique login credentials, which provides a controlled access to the infrastructure element 108 via the log generation system 110.

In one implementation, the log generation system 110 may receive a support action to be executed on the infrastructure elements 108. The support action may either be an operation performed by the user himself, or an operation performed by using search results from a knowledgebase. Further, every operation performed by the user on the infrastructure elements 108 may be appended to an operation log with corresponding ticket attributes and user attributes. The ticket attributes may include ticket category, ticket type, and ticket summary, while the user attributes may include user ID, support team, and role. The operation logs may be stored in operation log data 111.

The system 102 may obtain one or more operation logs from the operation log data 111 for knowledge acquisition to determine and subsequently generate automated units. The system 102 may filter the contents of the operation log based on one or more filtering attributes. The filtering attributes include for example, role of a user, ticket classification, type of server's platform, such as Unix®, Windows®, and Linux®. Based on the filtering attributes, a filtered content for further analysis is generated. In an example, Category, Type, Item, and Summary (CTIS) may be used as major filtering attributes. The filtering attributes may be selected based on a type of an automatable unit to be determined. For determining standard operators the filtering could be done based on technology area, which may be filtered by category and type. Further, as a user, such as administrator, may be interested in identifying standard operators for Linux and may be interested in the operations performed by experienced users alone. In such a case filtering may be based on category of technology area and role of the users.

For control flow generation, the filtering could be based on the specific kind of issue for which a control flow is to be generated and therefore category, type, item, and summary may be used as filtering attributes. The filtered content may be cleaned for removal of noise, such as redundant commands, empty commands and generalizations, based on the cleaning configuration data. Finally, the cleaned content may be analyzed using a sequence mining or a graph mining technique, based on the type of the automation unit to be identified as will be explained in details with reference to description of FIG. 2. The analyzed content may be further validated by a user and then finally automated, and provided in the support service knowledgebase 112 for use by support teams.

Thus, the operation logs are used as input by the system 102, which subsequently filters, cleans and analyses the operation logs to determine and subsequently generate the automated units, such as standard operators and control flow/scripts as an output. The output may be stored in a support service knowledgebase 112 from where the standard operators and control flows may be offered to and used by the users in the support team. Accordingly, based on the operation log, the support service knowledgebase 112 may be generated and dynamically updated. Although, the support service knowledgebase 112 has been illustrated internal to the system 102; however it will be understood that the service support service knowledgebase 112 may be provided as an external repository as well. In another example, the support service knowledgebase 112 may be provided in the log generation system 110.

Figure 2:
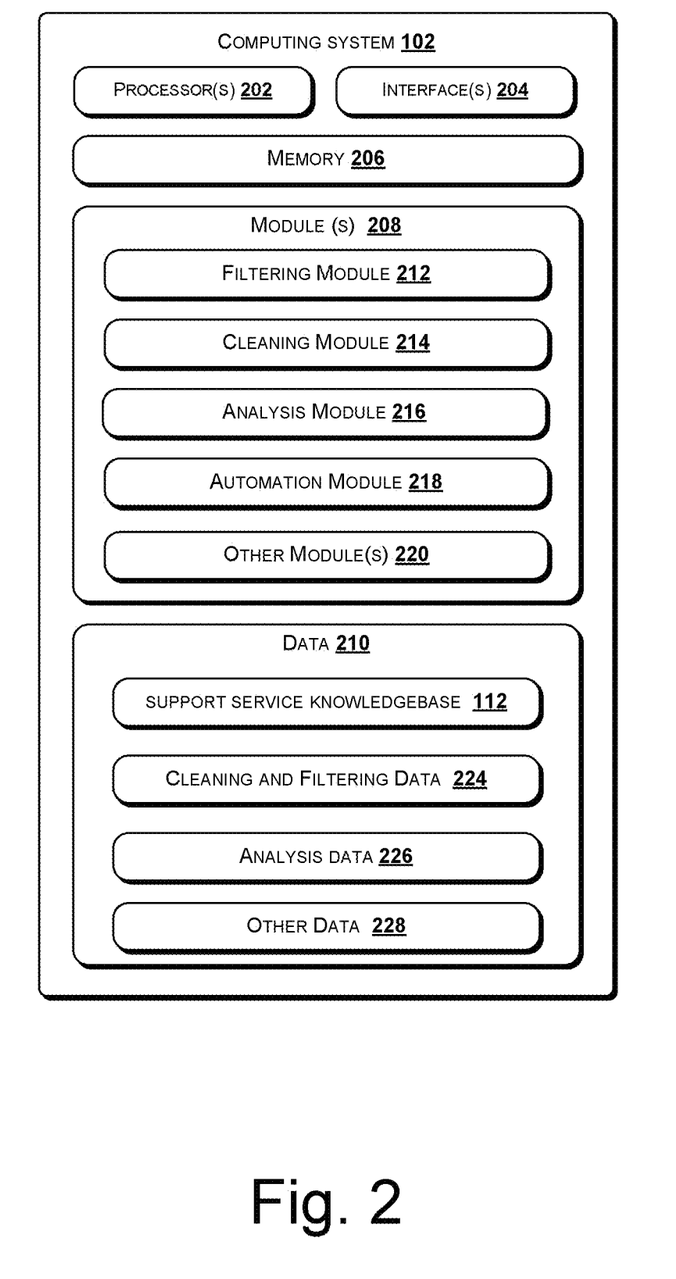
FIG. 2 illustrates various components of the computing system, in accordance with an implementation of the present subject matter.

FIG. 2 illustrates components of the system 102, according to an embodiment of the present subject matter. In one implementation, the system 102 includes processor(s) 202, interface(s) 204 and a memory 206. The processor(s) 202 can be a single processing unit or a number of units, all of which could include multiple computing units. The processor(s) 202 may be implemented as one or more microprocessor, microcomputers, digital signal processors, central processing units, state machines, logic circuitries, and/or any devices that manipulate signals based on operational instructions. Among other capabilities the processor(s) 202 are adapted to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface 204 may include a variety of software and hardware interfaces, for example, interface for peripheral device(s), such as a keyboard, a mouse, and an external memory. Further, the interface(s) 204 may include one or more ports for connecting the system 102 with other computing devices, such as web servers, and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may be coupled to the processor 202 and may include any computer-readable medium known in the art including, for example, volatile memory, such as Static Random Access Memory (SRAM) and Dynamic Random Access Memory (DRAM), and/or non-volatile memory, such as Read Only Memory (ROM), Erasable Programmable ROMs (EPROMs), flash memories, hard disks, optical disks, and magnetic tapes.

The system 102 may also include module(s) 208 and data 210. The modules 208 and the data 210 may be coupled to the processor(s) 202. The modules 208, amongst other things, include routines, programs, objects, components, data structures, etc., which perform particular tasks or implement particular abstract data types. The modules 208 may also be implemented as, signal processor(s), state machine(s), logic circuitries, and/or any other device or component that manipulate signals based on operational instructions.

In another aspect of the present subject matter, the modules 208 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions can be also be downloaded to a storage medium via a network connection.

The module(s) 208 includes, for example, a filtering module 212, a cleaning module 214, an analysis module 216, an automation module 218, and other module(s) 220. The other module(s) 220 include programs that supplement applications or functions performed by the system 102. The data 210 serves, amongst other things, as a repository for storing data obtained and processed by one or more module(s) 208. The data 210 includes, for example, the support service knowledgebase 112, cleaning and filtering data 224, analysis data 226, and other data 228. The other data 228 includes data generated as a result of the execution of one or more modules in the other module(s) 220.

In an implementation, a ticket is created for each issue detected in an infrastructure element. Further, the ticket may be allocated to a user from a support team to resolve the ticket. In order to resolve the issue associated with the allotted tickets, the user may perform a support action on the infrastructure element. Details pertaining to the support action performed on the infrastructure, ticket ID and associated ticket attributes, and the user may be captured in a single log, referred to, as an operational log. Details for the support action include, for example, what command, operation, or support service was performed, source of the operation, such as service catalog and knowledgebase, information element on which the support action is performed, session ID, time stamp of each operation/command in the support action, which may be used to derive the time taken to resolve the ticket, output of the command. The ticket attributes may be defined as one or more characteristics of the ticket which provide details pertaining to the issue associated with the ticket. Example of the ticket attributes include, but are not limited to, ticket category, ticket type, and ticket summary. For the details pertaining to the user may include, for example, user ID, support team, and role.

Thus, every operation performed by the user may be captured and appended to an operation log, which is dynamically updated and functions as the dynamic knowledgebase. The operation log functions as a repository of information pertaining to support actions performed on various infrastructure elements by various users, and may help in retrieval of context related information. The operation log includes the information in a manner so as to facilitate easy retrieval of the collected information, based on the ticket attribute data. In an example, the operational log may be realized with a Relational DataBase Management System (RDBMS), to facilitate extraction of related information.

Upon performing above mentioned steps, a large set of operational log sequences with the information about the issue/request's category, type, item and summary as the classification attributes may be generated. One operational log sequence may be understood as an ordered set of each action performed by the resolver.

In an implementation, the operation logs may be obtained and stored in the operation log data 111 for further analysis to generate and update the support service knowledgebase 112. To generate the support service knowledgebase 112, a user may specify the type of automatable unit to be determined. Based on the type of the automatable unit, the filtering module 212 may filter one or more operation logs. As mentioned before, the operation logs may be filtered based on the filtering attributes provided by user.

For example, for identifying standard operators for Unix® tower, the operation logs may be filtered to get only Unix® operational logs. These filtered logs correspond to all operations done by all users on all Unix® servers. Additionally, more filters, such as roles, ticket classification, may be applied for further filtration to obtain filtered content. In an example, a user may also be provided with an option to edit the auto-filtered output. Alternatively, the default filtering parameters for each type of automatable unit may be defined and stored in the cleaning and filtering data 224. The filtering module 212 may accordingly filter the operational logs based on values provided for default filtering attributes to obtain filtered content, which may be stored in the analysis data 226.

In an example, the filtering module 212 on receiving filtering attributes may include a check determine whether an automated unit to resolve a ticket type or classification selected based on the selected filtering attributes already exists in the support service knowledgebase 112. If the automated unit already exists, the user may be provided a prompt by the filtering module 212 and the user may accordingly decide whether or not such an automated unit for is to be generated. This may prevent duplicate generation of already existing automated units and at the distinct automated units for resolving similar tickets may be generated without additional efforts. Further, the filtering module 212 may provide filtered content arranged in a manner defined by content display criteria. For instance, the content display criteria may indicate an order in which received content is to be provided. The content may be displayed in a given order based on average execution time, ticket volume, and total execution time.

The filtered content may be not as voluminous as the original operational log and may be used for further analysis. In an example, subsequent to filtration, the cleaning module 214 may analyze the filtered content to identify noise, based on cleaning configuration data, which may be stored in the cleaning and filtering data 224. The cleaning configuration data may include information pertaining to operations that may be classified as noise, when analyzing a log. The cleaning configuration data may include, for example, information pertaining to redundant commands, empty commands, and generalizations. The information pertaining to generalization may provide for generalization of a command so that multiple instances of such a command can be identified. For instance, many operations are associated with command options and parameters, such as machine name, host name, and IP address. Such operations may include a regular expression segment and a command option or command parameter segment. Consider a command where a user name is to be created, in said case the command may be create <user name>, where 'create (.*)' can be considered as the regular expression and <user name> as option. Further, it will be appreciated that in each instance <user name> field may have different values because of which similar commands may not be identified. Accordingly, such commands may be generalized during cleaning of the filtered content so that multiple instances of the same command can be appropriately identified.

Similar to filtering attributes, the cleaning configuration data may also include rules indicating which commands/content included in the cleaning configuration data are to be removed from the filtered content, based on the type of the automatable unit. For instance, certain commands may be taken as noise while identifying standard operators, while the same commands may have to be considered while providing the control flows. Accordingly, the cleaning module 214 may remove or alter the commands from the filtered content that may be identified as based on the cleaning configuration data. The cleaning may include removal consecutive redundant commands, empty commands, such as ENTER key press, and generalization of commands to provide for multiple instances of same command during subsequent analysis of the content.

In an example, the user may edit the auto-cleaned output, which may be substantially free from noise. The cleaned content thus obtained may include a homogenous set of sequences, where each sequence may include multiple commands performed to resolve a single ticket in a single session. For example, for every instance of an issue faced by a user, user may raise new ticket, with different environment command parameters like host name, IP address, etc. While resolving that ticket, the user may open a new and unique session, and perform a set of commands, in a given order, to resolve the ticket. A collection of the ordered set of commands from each such unique session may be understood as a sequence.

The homogeneous set of sequences, i.e., the cleaned content upon cleaning may be stored in the analysis data 226. The cleaned content may be further analyzed by the analysis module 216 for identifying the possible candidates for automation. The analysis may be performed using one a sequence mining technique and a graph mining technique, based on the type of the automatable unit. The output generated at various stages of analysis may be stored in the analysis data 226.

Determining Standard Operators

Considering that the standard operators are to be identified, the analysis module 216 may implement sequence mining technique, such as an apriori based sequence mining technique. The analysis module 216 using the sequence mining technique identifies repeated patterns from the cleaned content. A pattern may be understood to be a block of consecutive and ordered commands and a repetitive pattern may be understood to be a pattern having a frequency greater than a threshold frequency.

In an example, as it may not be possible to identify exact matches, while identifying the repeated patterns, a provision to allow some extent of inexactness may be provided by was of tolerance threshold. Accordingly, a user may provide tolerance threshold, which may define the extent of inexactness permissible for determining repeated patterns. For instance, if the user wishes to have an exact match, then the tolerance threshold may be set as '0'. In case the user wishes to allow some exactness, the tolerance threshold value may be set to, for instance, '1'. In said case, blocks of commands with one different command may not be considered as different patterns but may be accounted as an instance of a same pattern 'P'. Likewise, for tolerance threshold '2', there may be two different commands and so forth. Thus, the analysis module 216 may identify the matching patterns, based on the tolerance threshold.

In one example, analysis module 216 may start with a predetermined number of commands, say two, forming a pattern. In other words, analysis may begin with a pattern having a predetermined length. Thus, a pattern length may be understood as number of commands in a pattern. For instance, the present technique may take pattern length to be at least two, '2', as against traditional apriori techniques. Further, it will be appreciated that, based on user preference and application, the pattern length may be set higher than 2 as well.

The analysis module 216 may further determine a frequency of the pattern in the homogeneous set of sequences. The frequency may be understood as number of times a given pattern occurs in the homogeneous set of sequences. To compute the frequency, the analysis module 216 may instead of performing read operation over each and every sequence repetitively, may store metadata about every occurrence in a set and may determine cardinality of that set, which in turn may provide the frequency. This may be achieved by maintaining a pre hash table or map and post hash table, as will be explained in detail below. The pre-hash table and the post-hash table may aid in determining the frequency of the pattern. A hash value of the pre-hash table and the post hash-table is a set of occurrences of the pattern in the content and the hash key is a pattern determined in the cleaned content. In other examples, the analysis module 216 may implement one a suffix tree data structure and a directed acyclic graph data structure to determine a frequency of the pattern.

The computed frequency may be compared with a threshold frequency and in case the computed frequency is ascertained to be less than the threshold frequency, the pattern may be discarded. However, in case it is ascertained that computed frequency is greater than or equal to the threshold frequency, the pattern is identified as repeated pattern. For the identified repeated pattern, the pattern length may be incremented by one and again it may be determined whether the new pattern is a repeated pattern or not. A group of such patterns may be referred to as an iterative group of repeated patterns. In other words, a group having repeated patterns, where a pattern length of a pattern is incremented by one each time the pattern is identified as a repeated pattern, may be referred to as the iterative group.

For the purpose of explanation, in the iterative group, a first repeated pattern may be referred to as repeated pattern A and the new pattern may be referred to as pattern B. If the new pattern, i.e., pattern B is not identified as repeated pattern, the analysis module 216 may select the repeated pattern A as a candidate for automation. Otherwise, the pattern length may again be incremented by one and the process is continued till a repeated pattern with a maximum pattern length is identified. Thus, in the iterative group a repeated pattern with maximum pattern length may be selected as a candidate for automation. Accordingly, a repeated pattern may be identified from each of one or more iterative groups as a candidate for automation.

The identification of the standard operators using the apriori based sequence mining technique may be understood with the following example. Considering that all possible blocks of sequences are created in $O(l^2)$ time complexity for a given sequence of the length l, i.e., by selecting block start index $l_s$ and block end index $l_e$ in $\binom{l}{2}$ different ways. The length '1' may indicate an upper bound on the pattern length and any block of sequences of length 1 to '1' may be a potential pattern. If there are such n sequences, then the time complexity will be $O(n \cdot l^2)$. A hash map may be used to store the sequences and their frequency. The patterns having at least threshold frequency may be sorted in the decreasing order of their length and frequency. Thus, the patterns occurring more than the threshold number of times may be said to have enough support to be considered as a potential pattern. As discussed above, the present apriori version of the sequence mining technique provides the iterative technique for generation of patterns by pruning the candidates violating the minimum support criteria, which will reduce the time complexity substantially.

A set of patterns may be considered to be matching even if they differ by an acceptable level, based on a tolerance threshold provided by a user. Accordingly, based on the tolerance threshold parameter defined by the user, a set of patterns may be identified. For instance, every resolver from ITIS domain may not be an expert and may run a few unnecessary commands in between actual or useful commands. This unintentional noise may prevent an occurrence of a pattern, and consequently the pattern may not be recognized, which in turn may reduce the number of occurrences of the pattern. To ensure that a pattern may not be missed during identification process due to such unintentional noise, a user may define the tolerance threshold. Further, in an example, subsequent to the pattern finding may be performed and the commands that appear to be noisy may be filtered out, for instance, by the user.

For the purpose of explanation, the set of all sequences may be denoted by set $P=\{P^i\}$ and the $j^{th}$ command from the $i^{th}$ sequence by $P_j^i$. Further, every occurrence of a pattern may be denoted by an integer triplet $\{(i, s, e)\}$, i.e., the contiguous subsequence starting at index s and ending at index e from the $i^{th}$ sequence. Hence, a triplet $(i, s, e)$ represents a contiguous subsequence$(P_s^i, P_{s+1}^i, \ldots, P_e^i)$. Initially the sequence data is parsed and the $F_2$ set is created by generating all distinct $(P_j^i, P_{j+1}^i)$ pairs of consecutive commands along with, set of all triplets corresponding to the occurrence of pattern $(P_j^i, P_{j+1}^i)$ simply denoted by $\overline{(P_j^1, P_{j+1}^1)}$. A post hash map $hm_o$ may be created to store frequent pattern $(P_s^i, P_{s+1}^i)$, with the command $P_{s+1}^i$ as the hash key. Similarly, pre hash map $hm_r$ may be created to store frequent pattern $(P_s^i, P_{s+1}^i)$, with the command $P_s^i$ as the hash key. Here, initially for 2-length pattern the sequence end index $e=s+1$. That means $hm_r$ will have a hash map entry with command a and value as patterns starting with command a, i.e., ab, ac, ad, etc. Similarly $hm_o$ will have a hash map entry with command z and value as patterns ending with command z, i.e., wz, xz, yz, etc.

The frequent pattern of size k may be defined by $\alpha_k$. The $hm_r$ hash map entries may be denoted by $(\alpha_k, T_r)$ where $T_r=\{\beta_r\}=\{\{(r, s_r, e_r)\}\}$ with $\{(r, s_r, e_r)\}$ as set of triplets for pattern $\beta_r$ denoted by $\overline{\beta_r}$. The $hm_o$ hash map entries may be denoted by $(\alpha_k, T_o)$ where $T_o=\{\gamma_o\}=\{\{(o, s_o, e_o)\}\}$ with $\{(o, s_o, e_o)\}$ as set of triplets for pattern $\gamma_o$ denoted by $\overline{\gamma_o}$. In the present example, data structure entries only for patterns of size 2 are generated. It will be understood that using the following recursive technique, data structure entries for patterns of other sizes may be generated. An example of frequent sequence generation is provided below:

Input: noise c, support $min_{sup}$
Output: Complete set of frequent sequences, L
1: $hm'_r = \phi$ and $hm'_o = \phi$
2: $\forall$ key $\alpha_k$ such that $(\alpha_k, T_r) \in hm_r$ and $(\alpha_k, T_o) \in hm_o$ do
3: $\quad \forall (\beta_r, \gamma_o)$ pairs such that $\beta_r \in T_r$ and $\gamma_o \in T_o$ do
4: $\quad\quad \forall$ triplets $\{(o, s_o, e_o)\} \in \overline{\gamma_o}$ and $\{(r, s_r, e_r)\} \in \overline{\beta_r}$ do -continued

```
5:         if r = o,s_o ≤ s_r ≤ e_o,e_r - s_o ≤ k + c do
6:             hm'_r += (γ_o,(r,s_o,e_r))
7:             hm'_o += (β_r,(r,s_o,e_r))
8: prune hm'_r and hm'_o by hm = hm\{( α_{k+1}, σ_{k+1})|min_{sup} > |σ_{k+1}|}
9: L = L ∪ { σ_{k+1}| σ_{k+1} ∈ value sets of hm'_r or hm'_o}
10: if (hm'_r ≠ φ and hm'_o ≠ φ)
11:         Frequent_Sequence_Generation(k + 1, hm'_r, hm'_o)
```

In an example, frequent patterns of contiguous subsequences may be generated, which is explained below. For a given sequence set, input for the frequent patterns generation mechanism may be given as below and the noise tolerance C may be considered to be zero.

TABLE 1

| SID | Sequence |
|---|---|
| $S_1$ | ACB |
| $S_2$ | ACBDE |
| $S_3$ | ACD |
| $S_4$ | ACDE |
| $S_5$ | ACBD |

As mentioned above, a repeated pattern may be understood as a pattern whose support is greater than the threshold frequency. Further, a pattern set may be denoted by $L_k$, where k is the size of the pattern. A candidate pattern is a frequently repeated pattern and a set corresponding to the candidate pattern may be denoted by $C_k$, where k is the size of the pattern. For instance, for $C_2$, the set of size 2, various patterns along with the frequency counts may be generated, in O(n·l) time where average sequence length is l and n such sequences. The patterns having frequency less than the threshold frequency may be pruned. In an example, if a sequence length is l, a pattern start point can be found in l ways and pattern end point in l ways, so total number of ways to create patterns may be l*l, i.e., l*l represents time complexity of the order of O(l*l). While forming the set of size 2 patterns, if the pattern start index is fixed, then the end index is start index plus one, and in such a case the pattern counting depends only on pattern start point counting, which is l, i.e., time complexity of the order of O(l).

The integer triplet {(i, s, e)} may be used to denote the pattern in $i^{th}$ sequence starting at index s and ending at index e. The 2 hash maps $hm_o$ and $hm_r$, are 2 intermediate data structures, created to speed up the next level candidate pattern generation. In post hash table $hm_o$, the set of patterns ending with 'D' are stored as hash value against the hash key 'D'. In pre hash table $hm_r$, the set of patterns starting with 'C' are stored as hash value against the hash key 'C'.

Frequent Pattern Generation Pass 1

In the first pass, nothing is pruned since all subsets of these patterns are frequent.

TABLE 2

| $C_2 = L_2$ | | |
|---|---|---|
| Pattern | supp(X) | Triplets |
| AC | 100% | {(1:5, 1, 2)} |
| CB | 60% | {(1:2, 2, 3), (5, 2, 3)} |
| CD | 40% | {(3:4, 2, 3)} |
| BD | 40% | {(2, 3, 4), (5, 3, 4)} |

TABLE 2-continued

| | | |
|---|---|---|
| DE | 40% | {(2, 4, 5), (4, 3, 4)} |

| Key X | Value |
|---|---|
| Post-Hash$_{2\ i.e.}$ $hm_o$ | |
| C | {AC} |
| B | {CB} |
| D | {CD, BD} |
| E | {DE} |
| Pre-Hash$_{2\ i.e.}$ $hm_r$ | |
| A | {AC} |
| C | {CD, CB} |
| B | {BD} |
| D | {DE} |

Frequent Pattern Generation Pass 2

In pass2, keys, say, 'C' from pre-hash table is obtained and it is looked up at post-hash map. If a match is found, all patterns from pre-hash map like {CD, CB} are iterated with respect to all patterns from post-hash map like {AC}. For example, pre-hash pattern CD is represented by triplets {(3:4,2,3)} and post-hash pattern AC is represented by triplets {(1:5,1,2)}. Wherever the joint is possible, the patterns are joined and stored. For instance, the triplets {(3:4,1,3)} may be stored against the next level pattern ACD (i.e., AC+CD.)

TABLE 3

| $C_2 = L_2$ | | |
|---|---|---|
| Pattern | supp(X) | Triplets |
| ACB | 60% | {(1:2, 1, 3), (5, 1, 3)} |
| ACD | 40% | {(3:4, 1, 3)} |
| CBD | 40% | {(2, 2, 4), (5, 2, 4)} |

| Key X | Value |
|---|---|
| Post-Hash$_{2\ i.e.}$ $hm_o$ | |
| CB | {ACB} |
| CD | {ACD} |
| BD | {CBD} |
| Pre-Hash$_{2\ i.e.}$ $hm_r$ | |
| AC | {ACB, ACD} |
| CB | {CBD} |

Frequent Pattern Generation Pass 3

For a key like 'CB' from pre-hash table, looked up at post-hash keys, and a match is found. All patterns from pre-hash table like {CBD} are iterated with respect to all patterns from Post-Hash like {ACB}. For example, pre-hash table pattern CBD is represented by triplets {(2,2,4), (5,2,4)} and the post-hash pattern ACB is represented by triplets {(1:2,1,3), (5,1,3)}. Since, the patterns can be joined, therefore they are then joined and resulting triplets {(2,1,4), (5,1,4)} are stored against the next level pattern ACBD (i.e., ACB+CBD.)

TABLE 4

| | $C_4$ | |
|---|---|---|
| Pattern | supp(X) | Triplets |
| ACBD | 40% | {(2, 1, 4), (5, 1, 4)} |

| Key X | Value |
|---|---|
| Post-Hash$_{2\ i.e.}$ hm$_o$ | |
| CBD | {ACBD} |
| Pre-Hash$_{2\ i.e.}$ hm$_r$ | |
| ACB | {ACBD} |

Determining Control Flows

In another example, where the control flows are to be identified, the homogeneous set of sequences are provided to the analysis module 216, which employs a graph mining technique for taking union of labeled graphs. It will be appreciated that to obtain sequences pertaining to particular kind of issue, a ticket type or a ticket summary may be used as filtering parameters.

To generate a control flow, the analysis module 216 may merge all sequences from the set of the homogeneous sequences. Each of the sequences may pertain to a solution for a ticket instance of the same issue. The merging may be performed by performing a union like operation repeatedly. The analysis module 216 may start with an empty resultant Directed Acyclic Graph (DAG) and keep on merging other DAGs to modify the given DAG. A DAG may be understood to be a directed graph having no directed cycles. The DAG may be formed by a collection of directed edges and vertices, where each edge connects a vertex, v, with another such that there is no sequence of edges that will eventually loops back to the vertex v again. In the present case, each DAG may correspond to a sequence from the set of homogeneous sequences.

In an example, the merging may be performed by adding one sequence at a time without loss of generality (WLOG). At every merge operation on an input DAG, i.e., while merging each sequence into a resultant DAG, two steps may be performed. Firstly, the analysis module 216 may compute the intersection of input DAGs as the LCG (Largest Common Graph) WLOG, thereby ensuring that the embedding, i.e., predecessor-successor relationship among graph vertices, remains intact for all input graphs At second step, the analysis module 216 may add the uncommon vertices from each DAG to the LCG ensuring the embedding remains intact. Each node of the LCG may indicate a state of an infrastructure element and possible actions to resolve the ticket, when the infrastructure element is in a given state.

In an example, for computing the LCG, the analysis module 216 may generate all valid common graphs for the input set of vertices, i.e., hyper-nodes. The largest and appropriate common graph may be selected as the intersection LCG. The hyper-node may be made up of one vertex from each input graph, where the vertex value matches. In an example, each sequence may have graph associated with it. Further, every vertex of the graph may represent a single command from that sequence. Thus, for k graphs, the set of hyper-nodes may be generated by taking all k-size cliques, i.e., exactly one vertex from every graph, from the constrained Cartesian product of all k graphs. It will be appreciated that two graphs may join over exactly matching commands only. Further, a valid common graph on hyper node may be understood to be the one which ensures the embedding from each input graph. The embedding in common graph may be ensured if there are no two hyper-nodes, or to say, two k-size cliques, either with common vertex or with conflicting embedding between vertices from any two graphs.

The identification of the control flows using the graph mining technique may be understood with the following example. In the example, a variant of a combinatorial approach is used to determine isomorphic directed sub graph from directed acyclic graphs. Further, the combinatorial approach may also use dynamic programming for reducing time complexity of the approach. The directed acyclic graphs may be combined using hyper-nodes and hyperlinks technique. Also for the information visualization, the control flow is shown with minimal edge crossings.

In the example, the homogeneous set of sequences, obtained after filtering and cleaning may be simple path graphs, the sequences may be stored as diagraphs with number of directed edges' count, which may be exactly less by one than the commands' count, i.e., length of the sequence. Using the graph mining technique, the largest common sub graph may be generated. For the purpose of explanation, the set of all command graphs may be denoted by set P={$P^i$} and the $j^{th}$ command from the $i^{th}$ graph by $P_j^i$. Since, these graphs are DAGs, these graphs may be stored with DAG data structure. To store the graphs with DAG data structure, the set of all valid hyper nodes of dimension d may be constructed if the number of input graphs for union is d i.e. P={$P^i$|0<i≤d}.

The vertex set of valid hyper nodes may be denoted by S={$S^i$|$P_{S_k^i}^k$=$\alpha^i$}, i.e., all the 1-dimensional input sequence nodes pertaining to the d-dimensional hyper node $S^i$, correspond to the same command $\alpha^i$. It may be observed that vertex set S is subset of the vertex cross product of all graphs from the ordered set P. Further, an InvalidMap, denoted by l, which is a hash map with entries pertaining to hyper node vertex as a key and edge set of hyper edges as a value, may be created. Here, an edge set of hyper edges for vertex $S^i$ may be created such that it gets invalidated because of the selection of the hyper node vertex $S^i$. The hash value may be denoted by l($S^i$). Consequently, the recursive largest common sub-graph generation (LCG) function is analogous to the constrained combinatory function. The initial call of the LCG function may be with complete valid hyper nodes set S as first parameter and remaining two parameters as empty sets, accordingly the call may be represented as LCG(S,φ,φ), C. Table 2 illustrates an example of the LCG function:

```
LCG(ordered set S, subset E, arSubSets U)
Input: InvalidMap, I
Output: Complete set of frequent sub graphs, U
1: if (S = φ)
2:     U = U ∪ E
3:     return;
4: for first element $S^O$ in ordered set S do
5:     LCG(S\$S^O$, E, U )
6:     LCG(S\(I($S^O$) ∪ $S^O$), E ∪ $S^O$, U)
```

In an implementation, for the iterations of control flow generation, the analysis module 216 may perform clustering on the sequences and graphs to ensure that the output control flow is more accurate. Generally, order of merging the sequences, affects the accuracy of final result. Further, the order of merging is based on clustering of the sequences in groups. The sequences may be clustered into groups, where the clustering may be based on sequence similarity scoring. In an example, for clustering, the graph seriation and graph edit distance methods may be used. The graph edit distance may also be used for determining sequence similarity scoring.

In another implementation, to optimize the number of edge crossing each other, better heuristics in the control flow, nodes display may be implemented to minimize the crossing number.

The above mentioned technique may be understood with the help of an example. Following table illustrates an example of log sequences for "Mount Point" issue. In the present example, as sequences keep on merging, acyclic graphs may be received.

TABLE 5 ping -c4 $hostname, echo "Hostname does not exists"
ping -c4 $hostname, ssh $hostname mount | grep $filepath, echo "File system already mounted"
ping -c4 $hostname, ssh $hostname mount | grep $filepath, ssh $hostname ls -ld $filepath, ssh $hostname mount $filepath $filepath, echo "File system not mounted"
ping -c4 $hostname, ssh $hostname mount | grep $filepath, ssh $hostname ls -ld $filepath, ssh $hostname mkdir $dirpath, echo "File system can not be mounted"
ping -c4 $hostname, ssh $hostname mount | grep $filepath, ssh $hostname ls -ld $filepath, ssh $hostname mkdir $dirpath, ssh $hostname mount $filepath $filepath, echo "File system not mounted"
ping -c4 $hostname, ssh $hostname mount | grep $filepath, ssh $hostname ls -ld $filepath, ssh $hostname mkdir $dirpath, ssh $hostname mount $filepath $filepath, echo "File system not mounted"
ping -c4 $hostname, ssh $hostname mount | grep $filepath, ssh $hostname ls -ld $filepath, ssh $hostname mkdir $dirpath, ssh $hostname mount $filepath $filepath, echo "File system mounted successfully"
ping -c4 $hostname, echo "Hostname does not exists"

Table 5 includes generalized session commands, which may be obtained upon performing a generalized step. In the generalization step, command parameter values may be replaced by $<parameter>. Further, in the example discussed in table 5 Technology Service, OS-Linux is considered. As it can be gathered form the table 5, eight operational log sequences for the Mount Point issue are obtained.

Figure 3:
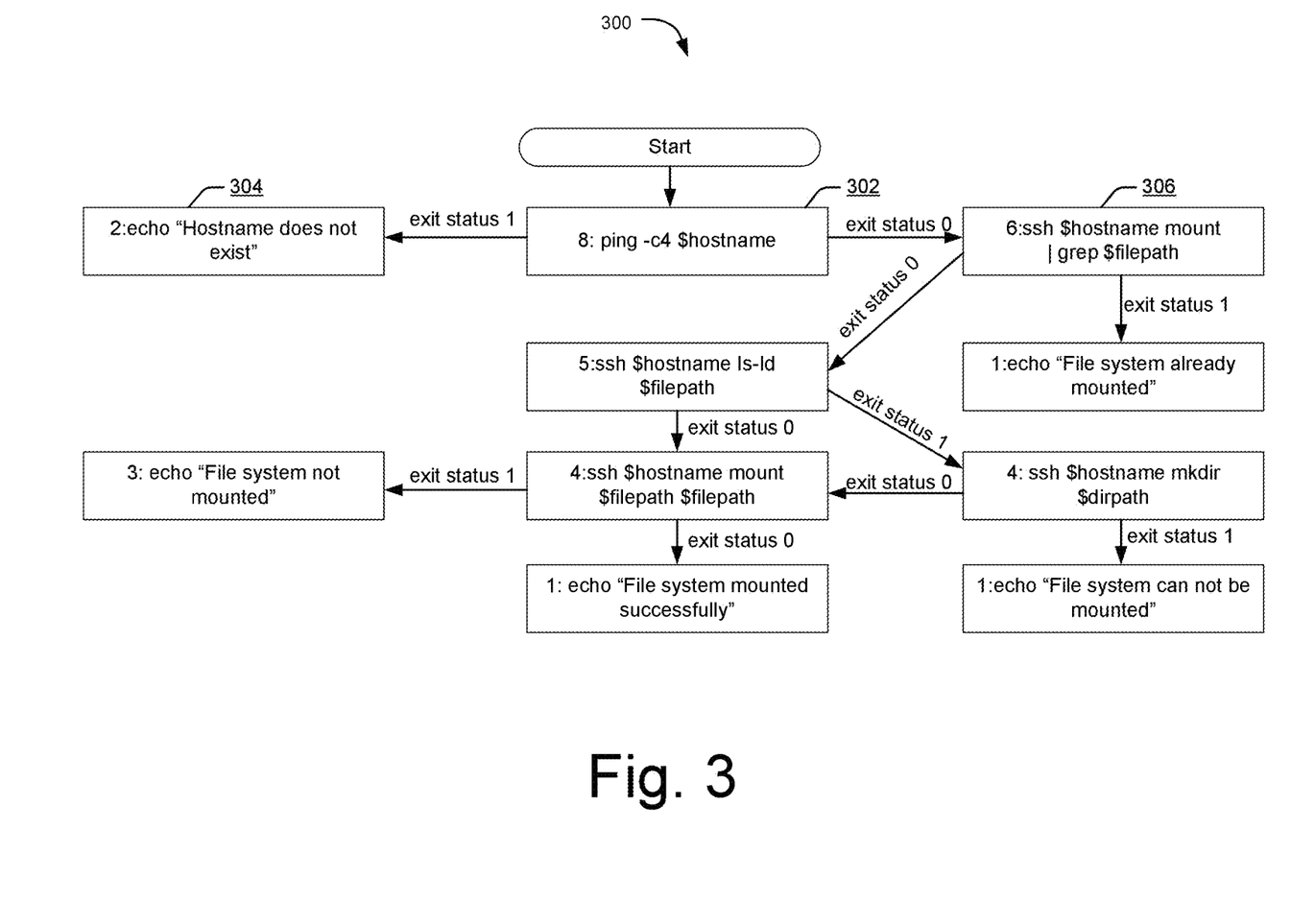
FIG. 3 illustrates a control flow generated by the computing system, according to an implementation of the present subject matter.

An example of a control flow 300 generated iteratively using the LCG finding and a graph union technique, is illustrated in FIG. 3. In FIG. 3, the digits in the parenthesis denote node number; further digit following the parenthesis indicates the number of occurrences of the command. Referring to node 0, marked as 302, it can be gathered that there are 8 occurrences of 'ping-c4 $hostname'. Further, referring to block 302, it can be gathered that there are two paths for the state 'ping-c4 $hostname', one that goes to node 1, marked as 304, where there 2 occurrences of 'hostname doesn't exist' and other that takes to node 2, marked as 306, where there are 6 occurrences of '$hostname mount) grep $filepath'. Similarly, block 306, i.e., from node 2 there are two further paths and so forth. Thus, the control flow captures all possible options available to a user of a production support team to resolve an issue. Accordingly, based on a current state of an infrastructure element, the user may perform one of the actions indicated by the control flow. It will be appreciated that in certain state of an infrastructure element may be identified from the command itself or may be identified from an output that was generated in response to the command.

The control flows are generated in model construction. For instance, the present subject matter provides for generation of a graph model of a process from a log of unstructured executions of the process. The resulting graph represents 'how' part of the process control, i.e., how to resolve a ticket. Further, the control flows satisfy completeness, irredundancy, and minimality criteria. To satisfy the completeness criteria, a control flow may preserve all the dependencies between activities that are present in the log. For instance, an operational log may be understood to be a sequence of commands, a graph for the session may be understood to be a path, and an execution path for a sequence inside a graph model, staring from a root to a leaf node, i.e., graph vertex may be mapped. Further, for different sequences, with alternate command sequence, the execution path inside the graph model may be different, i.e., root to a different node.

In the present case, the graph model, i.e., the control flow preserves all the dependencies between activities present in the operational log. For every session, i.e., a command sequence, there may be a unique root to a leaf node execution path within a graph model. Further, the graph model may include a directed edge between two mapped nodes for 2 consecutive commands from the session.

Further, to satisfy irredundancy criteria, a control flow may be such that it does not introduce spurious dependencies between activities. Finally, to satisfy the minimality criteria, the control flow should have the minimal number of edges to clarify the presentation.

In an example, upon determining the automatable units, i.e., based on the output generated by the analysis module 216, the automation module 218 may provide the automated units, such as control flow and the support services in the support service knowledgebase 112. For example, if one or more support services are identified as the candidates for automation, based on the further validation, for instance, by a user, such as a user from automatable unit generation team, the support services may be automated. Additionally, certain validation rules may also be associated the automated services. The validation rules provide a check to determine whether a user can perform the support service on an infrastructure element 108. It will be understood that the rules can be defined at any level, such as a role level, a user level, an operation level, and an infrastructure level. Similarly, the automation module 218, may store control flows in the support service knowledgebase 112 for use by support teams. Accordingly, the users may have access to a knowledgebase, which is updated dynamically, thereby enhancing the efficiency of the infrastructure support.

Figure 4:
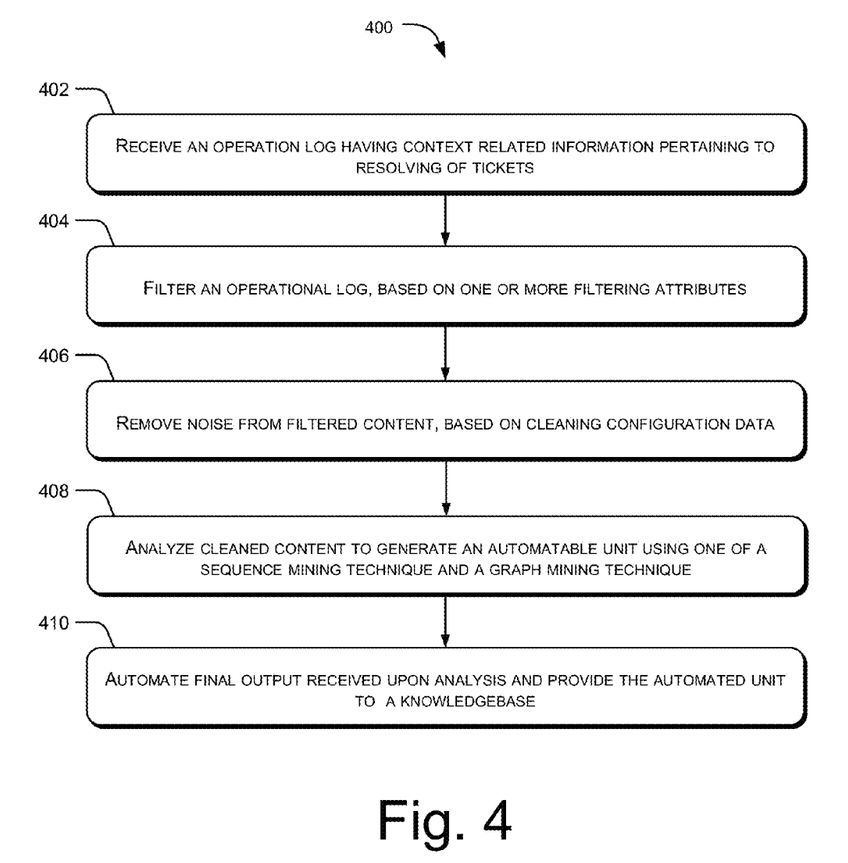
FIG. 4 illustrates a method for providing an automatable unit to provide support to infrastructure elements, in accordance with an implementation of the present subject matter.

FIG. 4 illustrates a method 400 for providing automated units to support infrastructure elements in IT environment, in accordance with an implementation of the present subject matter. In an example, the method 400 may be performed by a computing system such as, the system 102 described earlier.

The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method(s) is described is not intended to be construed as a limitation, and any number of the described method blocks can be combined in any order to implement the method 400, or an alternative method. Additionally, individual blocks may be deleted from the methods without departing from the spirit and scope of the subject matter described herein. Furthermore, the method 400 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, (for example, a memory), and executes those instructions, thereby performing one or more method(s), including one or more of the method(s) described herein. Such instructions may be stored and/or transmitted using any of a variety of known computer-readable media.

At block 402, an operation log having context related information pertaining to resolving of tickets may be received. The operation log may include, for example, information regarding various pertaining to various tickets and actions performed by various users to resolve the tickets may be received.

At block 404, the operation log may be filtered, based on one or more filtering attributes. The filtering attributes are selected based on a type of an automatable unit to be identified.

At block 406, noise from the filtered content may be removed, based on cleaning configuration data to obtain cleaned content. The cleaned content may include homogenous set of sequences, where each sequence may include multiple commands performed to resolve a single ticket in a single session. In an example, cleaning may be of the filtered content to remove noise may include generalizing commands to provide for identification of multiple instances of the same command during subsequent analysis at block 408.

At block 408, the cleaned content may be analyzed to generate an automatable unit using one of a sequence mining technique and a graph mining technique. The technique to be used may be selected based on the type of automatable unit being identified. In an example, where standard operators are to be identified, the sequence mining technique may be used. The standard operators may be identified based on a threshold frequency and a tolerance frequency. For instance, a frequency of a pattern may be determined, based on a tolerance threshold. The frequency may be compared with a threshold frequency and a pattern may be identified as a repeated pattern based on the comparison. Further, from the overlapping patterns, a repeated pattern with a maximum sequence length may be selected as a candidate for automation. For example from the overlapping patterns abc, bcd, abcd, the largest pattern abcd may be selected as a candidate for the standard operator). It will be appreciated that from the cleaned content one or more candidates may be identified. For example, a repeated pattern may include "abcdefgh", while another repeated pattern may be "stuvwxyzjk".

Further, in case control flows are to be determined, graph mining technique may be used. The control flows may identified based on generation of an LCG, which may be generated using simple path graphs, such as directed acyclic graph. The control flow may include various nodes, where each node may be state of an infrastructure element and possible actions to resolve the ticket, when the infrastructure element is in a given state.

At block 410, final output received upon analysis is automated and provided in a knowledgebase, such as the support service knowledgebase 112, accessible by the users for dynamically resolving tickets similar to the ticket. Thus, an automatable unit determined upon analysis at block 408 is provided as an automated unit is the knowledgebase. The support service knowledge 112 may accessed by support teams for resolving tickets. In an example, the support services may be provided as shell scripts and the control flows may be provided as a map, a table, or a flow chart, which takes into account the intermediate system state decision points. Further, it will be understood that the partial or complete automation of the service operations and the control flows may be provided.

Although embodiments for methods and systems for providing automatable units for infrastructure support have been described in a language specific to structural features and/or methods, it is to be understood that the invention is not necessarily limited to the specific features or methods described. Rather, the specific features and methods are disclosed as exemplary embodiments for providing the automatable units.

We claim:

1. A computing system for providing automatable units to users in information technology environment, the computing system comprising:
   a processor;
   a filtering module coupled to the processor to filter an operation log having information pertaining to actions performed to resolve a ticket, wherein the operation log is filtered based on filtering attributes for selection of content relevant for identifying an automatable unit;
   an analysis module coupled to the processor to generate the automatable unit, based on an analysis of the content using one of a sequence mining technique and a graph mining technique, wherein the automatable unit is one of a standard operator unit and a control flow unit, and wherein the standard operator unit comprises a set of instructions that are to be performed to resolve the ticket and the control flow unit comprises a set of possible actions to be performed for each of a plurality states of an infrastructure element to resolve the ticket associated with the infrastructure element, wherein the analysis module:
   determines a frequency of a pattern in the content, wherein the frequency is determined based on a tolerance threshold and a minimum pattern length, the tolerance threshold defining an extent of inexactness permissible between two patterns and a pattern length being a number of commands in the pattern;
   compares the frequency of the pattern with a threshold frequency; and
   identifies the pattern as a repeated pattern, based on the comparison; and
   an automation module to provide the automatable unit in a support service knowledgebase accessible by the users for dynamically resolving tickets similar to the ticket.

2. The computing system as claimed in claim 1, wherein the computing system further comprises a cleaning module coupled to the processor to remove noise from the content obtained upon filtering, based on cleaning configuration data, and wherein the cleaning configuration data includes information pertaining to operations that are classified as noise, and wherein cleaned content is analyzed for determining automatable units.

3. The computing system as claimed in claim 1, wherein the analysis module selects, from an iterative group of repeated patterns, the repeated pattern with a maximum pattern length as a candidate for automation.

4. The computing system as claimed in claim 1, wherein the analysis module maintains a pre-hash and a post-hash table to determine the frequency of the pattern, wherein a hash value of the pre-hash table and the post hash-table is a set of occurrences of the pattern in the content, and a hash key is the pattern in the content.

5. The computing system as claimed in claim 1, wherein the analysis module implements one of a suffix tree data structure and a directed acyclic word graph data structure to determine the frequency of the pattern.

6. The computing system as claimed in claim 1, wherein the analysis module:
   obtains a directed acyclic graph corresponding to each sequence in a set of homogenous sequences, wherein each vertex of the directed acyclic graph represents a command from a corresponding sequence; and
   merges a plurality directed acyclic graphs to generate a largest common graph representing the control flow unit, wherein each node of the largest common graph indicates a state of the infrastructure element and the possible actions to resolve the ticket, when the infrastructure element is in the state.

7. The computing system as claimed in claim 6, wherein the analysis module to merge the plurality of directed acyclic graphs:
   computes an intersection of input directed acyclic graphs as the largest common graph without loss of generality; and
   adds uncommon vertices from each graph to the largest common graph.

8. The computing system as claimed in claim 1, wherein the automation module associates validation rules with a support service corresponding to the standard operator unit, wherein the validation rules provide a check to determine whether a user can perform the support service on the infrastructure element.

9. A method for providing of an automatable unit comprising:
   filtering an operation log having information pertaining to actions performed to resolve a ticket, wherein the operation log is filtered based on filtering attributes for selection of content relevant for identifying an automatable unit;
   generating the automatable unit, based on an analysis of the content using one of a sequence mining technique and a graph mining technique, wherein the automatable unit is one of a standard operator unit and a control flow unit, and wherein the standard operator unit comprises a set of instructions that are to be performed to resolve the ticket and the control flow unit comprises a set of possible actions to be performed for each of a plurality states of an infrastructure element to resolve the ticket associated with the infrastructure element;
   providing the automatable unit in a support service knowledgebase accessible by the users for dynamically resolving tickets similar to the ticket;
   determining a frequency of a pattern in the content, wherein the frequency is determined based on a tolerance threshold and a minimum pattern length, the tolerance threshold defining an extent of inexactness permissible between two patterns and a pattern length being a number of commands in the pattern;
   comparing the frequency of the pattern with a threshold frequency; and
   determining the pattern as a repeated pattern, based on the comparison.

10. The method as claimed in claim 9, wherein the method further comprises removing noise from the content obtained upon filtering, based on cleaning configuration data, and wherein the cleaning configuration data includes information pertaining to operations that are classified as noise, and wherein cleaned content is analyzed for determining automatable units.

11. The method as claimed in claim 10, wherein the removing further comprising removing at least one of consecutive redundant commands and empty commands.

12. The method as claimed in claim 10, wherein the removing further comprises generalizing commands in the filtered content to provide for identification of multiple instances of same commands during analyzing.

13. The method as claimed in claim 9, wherein the method further comprises selecting, from an iterative group of repeated patterns, the repeated pattern with a maximum pattern length as a candidate for automation.

14. The method as claimed in claim 9, wherein the method further comprises:
   obtaining a directed acyclic graph corresponding to each sequence in a set of homogenous sequences, wherein each vertex of the directed acyclic graph represents a command from a corresponding sequence; and
   merging a plurality directed acyclic graphs to generate a largest common graph representing the control flow unit, wherein each node of the largest common graph indicates a state of the infrastructure element and possible actions to resolve the ticket, when the infrastructure element is in the state.

15. The method as claimed in claim 14, wherein the merging comprises:
   computing an intersection of input directed acyclic graphs as the largest common graph without loss of generality; and
   adding uncommon vertices from each graph to the largest common graph.

16. A non-transitory computer readable medium having a set of computer readable instructions that, when executed, perform a method for providing automatable units comprising:
   filtering an operation log having information pertaining to actions performed to resolve a ticket, wherein the operation log is filtered based on filtering attributes for selection of content relevant for identifying an automatable unit;
   generating the automatable unit, based on an analysis of the content using one of a sequence mining technique and a graph mining technique, wherein the automatable unit is one of a standard operator unit and a control flow unit, and wherein the standard operator unit comprises a set of instructions that are to be performed to resolve the ticket and the control flow unit comprises a set of possible actions to be performed for each of a plurality states of an infrastructure element to resolve the ticket associated with the infrastructure element;
   providing the automatable unit in a support service knowledgebase accessible by the users for dynamically resolving tickets similar to the ticket;
   determining a frequency of a pattern in the content, wherein the frequency is determined based on a tolerance threshold and a minimum pattern length, the tolerance threshold defining an extent of inexactness permissible between two patterns and a pattern length being a number of commands in the pattern;

comparing the frequency of the pattern with a threshold frequency;
determining the pattern as a repeated pattern, based on the comparison; and
selecting, from an iterative group of repeated patterns, the repeated pattern with a maximum pattern length as a candidate for automation.

17. The non-transitory computer readable medium as claimed in claim 16, wherein the method further comprises obtaining a directed acyclic graph corresponding to each sequence in a set of homogenous sequences, wherein each vertex of the directed acyclic graph represents a command from a corresponding sequence; and
merging a plurality directed acyclic graphs to generate a largest common graph representing the control flow unit, wherein each node of the largest common graph indicates a state of the infrastructure element and possible actions to resolve the ticket, when the infrastructure element is in the state.

* * * * *